United States Patent Office 3,754,090
Patented Aug. 21, 1973

3,754,090
PHARMACEUTICAL COMPOSITIONS AND METHODS FOR SUBSTITUTED PHENETHYL ALCOHOLS AND THEIR ESTERS
Ulrich Renner, Riehen, Switzerland, Niels Clauson-Kaas, Farum, Denmark, and Franz Ostermayer, Riehen, Switzerland, assignors to Ciba-Geigy Corporation
No Drawing. Original application Apr. 22, 1969, Ser. No. 818,409, now Patent No. 3,631,069, dated Dec. 28, 1971. Divided and this application Sept. 16, 1971, Ser. No. 181,222
Claims priority, application Switzerland, Apr. 29, 1968, 6,378/68
Int. Cl. A61k 27/00
U.S. Cl. 424—274    12 Claims

ABSTRACT OF THE DISCLOSURE

Compounds of the class of p-(1-pyrryl)-phenethyl alcohols and alkanoyl esters thereof have analgesic and anti-inflammatory properties; they are active ingredients of pharmaceutical compositions and are useful for alleviating pain and treating inflammatory diseases; illustrative embodiments are p-(1-pyrryl)-phenethyl alcohol and the propionic acid ester thereof.

CROSS-REFERENCE TO RELATED APPLICATION

This is a division of Ser. No. 818,409, filed Apr. 22, 1969 and now U.S. Pat. No. 3,631,069.

DETAILED DESCRIPTION

The present invention relates to substituted phenethyl alcohols and alkanoyl esters thereof, which compounds have valuable pharmacological properties, to pharmaceutical compositions containing them and to methods of alleviating pain and treating inflammatory diseases comprising administering them.

More particularly, the present invention relates to compounds of Formula I

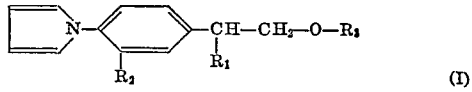

(I)

wherein $R_1$ is hydrogen, methyl or ethyl,
$R_2$ is hydrogen or halogen up to the atomic number 35, and
$R_3$ is hydrogen or alkanoyl, having from 2 to 5 carbon atoms.

In the compounds of Formula I, $R_2$ as haolgen is fluoro, chloro or bromo, preferably chloro. $R_3$ as alkanoyl group having from 2 to 5 carbon atoms is, for example, the acetyl, propionyl, butyryl, isobutyryl, valeryl, isovaleryl or pivalyl group.

A preferred subclass are compounds of Formula I, wherein $R_1$ is hydrogen or methyl, $R_2$ is hydrogen or chloro, and $R_3$ is hydrogen, acetyl, propionyl or pivalyl.

Preferred members of the subclass are:

p-(1-pyrryl)-phenethyl alcohol,
3-chloro-4-(1-pyrryl)-phenethyl alcohol,
β-methyl-p-(1-pyrryl)-phenethyl alcohol,
3-chloro-4-(1-pyrryl)-β-methylphenethyl alcohol,
propionic acid-p-(1-pyrryl)-phenethyl ester,
propionic acid-3-chloro-4-(1-pyrryl)-phenethyl ester,
pivalic acid-p-(1-pyrryl)-phenethyl ester, and
acetic acid-p-(1-pyrryl)-phenethyl ester.

The compounds of the present invention were found to have valuable pharmacological properties, in particular analgetic, anti-inflammatory and antipyretic activity combined with a favorable therapeutic index. The pharmacological activity of the compounds of the invention is determined in various standard tests with experimental animals.

The analgesic activity is demonstrated in the "writhing test" in mice. This test is described by E. Siegmund, R. Cadmus and G. Lu, Proc. Soc. Exp. Biol. Med. 95, 729 (1957). The amount of test substance is determined preventing in the test animals the syndrom produced by intraperitoneal injection of 2-phenyl-1,4-benzoquinone. Excellent results are obtained by oral administration of 25 mg./kg. of bodyweight of p-(1-pyrryl)phenethyl alcohol.

As an example of the use as anti-inflammatory agent, the use of p-(1-pyrryl)-phenethyl alcohol in bolus alba induced edema in the rat paw is described. The test used is that described by G. Wilhelmi, Jap. Journ. Pharmac. 15, 190 (1965). The compound under investigation is administered to rats perorally through an esophageal sound. One hour thereafter, bolus alba edema is induced by subcutaneous injection of 0.1 ml. of a 10% suspension of finely sieved bolus alba in tragacanth into the plantar region of the right hand paw of the rats. Another group of rats having not obtained the test compound but the bolus alba, serves as control group. Each group consists of 20 male albino rats weighing about 110 to about 130 g. The intensity of the swelling of the rats' paw is determined 5 hours after the bolus alba injection, by measuring the weight differences of the unswollen left paws and the swollen right paws. Thus it is determined that p-(1-pyrryl)-phenethyl alcohol administered in a dosage of about 10 mg./kg. of bodyweight significantly inhibits the formation of the bolus alba edema indicating a pronounced anti-inflammatory activity.

Similar analgesic and anti-inflammatory activities are found with other compounds of the invention.

The toxicity of the compounds of the invention as determined in rats on oral administration is of favorable low order.

For the preparation of the substituted phenethyl alcohols and the esters thereof according to the Formula I, a compound of Formula II

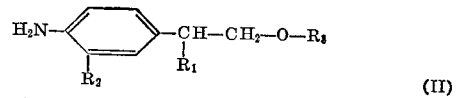

(II)

in which $R_1$, $R_2$ and $R_3$ have the meanings given under Formula I is reacted with monomeric or polymeric succinic aldehyde or an open or cyclic reactive functional derivative of the monomeric succinic aldehyde. The succinic aldehyde is added in its monomeric form (which immediately before the reaction is obtained from a functional derivative or from distillation of polymeric form) or in a polymeric modification (cf. C. Harries Ber. 35, 1183–1189 [1902]).

As functional derivatives of the monomeric succinic aldehyde are used preferably open or cyclic acetals, acylals, α-halogen ethers, enol ethers or enol esters corresponding to the general Formula III

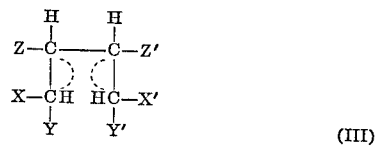

(III)

in which

X and X' are independently of each other, rests of formulae R—O— and R—CO—O in which R stands for an optional halogen substituted hydrocarbon rest, or chlorine or bromine atoms, or X' together with Y' is also the oxo rest =O, Y and Y' are independently of each other, rests of the before defined formulae R—O— or R—CO— or both together the epoxy rest —O—, or each together with Z and Z' respectively each an additional binding according to the dotted lines and Z and Z' are hydrogen atoms if they do not have any of the before mentioned meanings, in the presence or absence of a diluting and/or condensation agent.

Of the compounds of Formula III which can be used instead of succinic aldehyde are named as examples of open chained derivatives of the monomeric succinic aldehyde and the acetals thereof e.g. succinic aldehyde monodiethyl acetal, -bis-dimethyl-acetal, -bis-diethyl-acetal, acylals like succinic aldehyde-1,1-diacetate (4,4-diacetoxybutyraldehyde), enol ethers like 1,4-diphenoxy-butadiene, enol esters like 1,4-diacetoxy-butadiene. Compounds of Formula III in which Y and Y' form together the epoxy rest are derivatives of the tetrahydrofuran which depending on the meaning of X and X' react like acetals or acylals of the succinic aldehyde or like open chained α-halogen ethers.

Such compounds are for instance the 2,5-dialkoxy-tetrahydrofurans and relatives like 2,5-dimethoxy-, 2,5-diethoxy-, 2,5-dipropoxy-, 2,5-dibutoxy-, 2,5-bis-allyloxy-, 2,5-bis-(2-chloro-ethoxy)-, 2,5-diphenoxy- and 2,5-bis-(3,4-xylyloxy)-tetrahydrofuran, other 2,5- diacyloxy-tetrahydrofurans like 2,5-diacetoxy-tetrahydrofuran as well as 2,5-dihalogentetrahydrofuran like 2,5-dichloro-tetrahydrofuran and 2,5-dibromo-tetrahydrofuran and finally also compounds which belong at the same time to both types like 2-chloro - 5 - (2-chloro-ethoxy)-tetrahydrofuran and 2-allyloxy-5-chlorotetrahydrofuran.

As medium for the above process using the free succinic aldehyde or succinic aldehyde liberated in situ, any solvent in which the succinic aldehyde is soluble may be used, for instance methanol, aqueous dioxane or acetic acid. Acetals and acylals of the succinic aldehyde as well as cyclic or acetal like derivatives are reacted preferably in acetic acid as solvent and condensation medium or in presence of catalytic amounts of an acidic condensation agent like p-toluol sulfonic acid in presence or absence of an inert organic solvent or diluting agent like for instance xylol, toluene, o-dichlorobenzene or acetonitrile. The reaction of compounds of Formula III in which X and/or X' are halogen atoms is carried out for instance in inert organic solvents like chloroform or the named before. The reaction temperature is preferably between room temperature and boiling temperature of the used solvent or diluting agent whereby the lowest range is particularly for the last named halogen compounds.

If the ring closure reaction is carried out in a lower alkanoic acid like for instance acetic acid one obtains as reaction product besides the desired p-(1-pyrryl)-phenethyl-alcohol partially also the corresponding lower alkanoic acid esters thereof so that the crude product has to be hydrolised by boiling in alkanolic alkali hydroxide. By use of other reaction media like for instance acetonitrile with a slight addition of p-toluene sulfonic acid the aforementioned after-operation can be avoided.

Of the starting materials of Formula II the p-aminophenethyl alcohol is known. Starting materials with a lower alkyl group $R_1$ and hydrogen as $R_2$ are obtained for instance by reduction of lower 2-(p-aminophenyl)-alkanoic acids like the known p-amino-hydratropic acid and the also known 2-(p-aminophenyl)-butyric acid or the esters thereof with lithium aluminum hydride according to a method for preparation of compounds of Formula I as mentioned hereafter. The corresponding starting materials of Formula II with a halogen atom $R_2$ are obtained for instance by N-acetylation of the above named lower 2-(p-aminophenyl)-alkanoic acids, halogenation, for instance chlorination with hydrochloric acid and sodium chlorate, hydrolytic cleavage of the N-acetyl group and reduction of the obtained lower 2-(4-amino-3-halogen- phenyl)-alkanoic acids with lithium aluminum hydride. Compounds of Formula II with a lower alkanoyl group $R_3$ are obtained for instance by catalytic hydrogenation of corresponding nitro compounds for instance of the known acetic acid-p-nitrophenethylesters.

According to a second method for preparation compounds of Formula I with a hydrogen atom as rest $R_3$ i.e. substituted phenethyl alcohols of Formula Ia

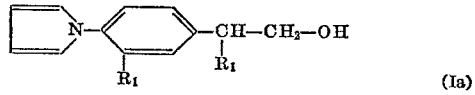

(Ia)

in which $R_1$ and $R_2$ have the same meanings given under Formula I are prepared by reduction of a compound of Formula IV.

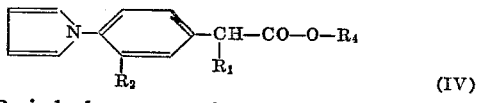

(IV)

in which $R_4$ is hydrogen or a lower alkyl group and $R_1$ and $R_2$ have the meanings given under Formula I with a complex hydride in an organic solvent. As complex hydride is used, for instance, lithium aluminum hydride or if, in the starting material $R_4$ is a hydrogen atom also diborane, and the reduction is carried out at temperatures between ca. 0° and 100°. As organic reaction medium there are suitable for instance diethyl ether, dibutyl ether, tetrahydrofurane, dioxane, ethylenglycol dimethylether or diethylenglycol dimethylether. The diborane is generated for instance from sodium borohydride and bortrifluoride etherate, either in a separate apparatus and introduced into the reaction mixture or in situ. Starting materials of the Formula IV in which $R_4$ represents an alkyl group, can e.g. be reduced also with sodium borohydride in methanol. The compounds of the Formula IV are obtained for instance according to the first named method for preparation of compounds of Formula I if one condenses, instead of the amino compounds of Formula II, the already named before lower 2 - (p - aminophenyl)-alkanoic acids or 2 - (4 - amino-3-halogenphenyl)-alkanoic acids or the lower alkyl esters thereof with reactive functional derivatives of the succinic aldehyde, like for instance 2,5-dimethoxy-tetrahydrofuran.

The compounds of Formula Ia are obtained according to a third method by hydrolysis of an ester which falls within the scope of Formula I of Formula Ib

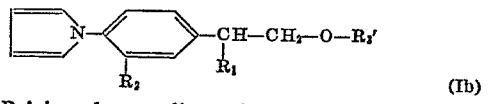

(Ib)

in which $R_3'$ is a lower alkanoyl group and $R_1$ and $R_2$ have the meanings given under Formula I. The hydrolysis can be carried out in known manner in an acidic or preferably in an alkaline medium. For instance, an ester of Formula Ib is boiled in an alkanoic or alkanoic-aqueous alkali hydroxide like ethanolic sodium hydroxide.

Esters of Formula Ib are obtained for instance according to the first named method for preparation of compounds of Formula I. Another method for preparation of esters of Formula Ib will be given later.

According to a fourth method, one obtains esters of Formula Ib, by alkanoylation of a substituted phenethyl alcohol of Formula I. The alkanoylation is carried out in the usual manner. For instance, a substituted phenethyl alcohol of Formula Ia is reacted with the anhydride of a lower alkanoic acid, like acetanhydride or propionic acid anhydride, in presence of a tert. organic base, such as for instance pyridine, in an inert organic solvent, like for instance benzene, at room temperature to boiling temperature of the medium or one of the named alcohols is reacted with a lower alkanoic acid halogenide, like for instance acetyl-chloride, propionylchloride, butyrylchloride, isobutyryl-chloride, valerylchloride or pivalylchloride, in presence of an acid binding agent, like for instance pyridine, 2,6-lutidine or sym. collidine, in an inert organic solvent, like for instance methylenechloride, chloroform or benzene, at temperatures between ca. 0° and 80°.

According to a fifth method, esters of Formula Ib are prepared by reacting a reactive ester of a substituted phenethyl alcohol of Formula Ia with a metal salt of a lower alkanoic acid. As reactive esters there are used, particularly halogenides, i.e. p - (1 - pyrryl) - phenethyl halogenides, for instance chlorides or bromides, which can be substituted according to the definitions for $R_1$ and $R_2$ or alkanoic sulfonic acid esters or arene sulfonic acid esters, like for instance methanesulfonic acid or p-toluene sulfonic acid esters. As metal salts of lower alkanoic acids can be used alkali metal salts, like the sodium and potassium salts, additionally silver, lead or mercuric salts of lower alkanoic acids, like acetic acid, propionic acid, butyric acid, isobutyric acid, valeric acid, isovaleric acid and pivalic aid. The reaction is achieved by heating the reaction components in presence or absence of inert organic solvents, like for instance benzene, toluene, ethanol, dimethylsulfoxide, dimethylformamide, acetone, butanone, tetrahydrofuran or dioxane, if necessary in a closed reaction vessel.

Reactive esters of substituted phenethyl alcohols of Formula Ib which are used as starting materials can be prepared from alcohols according to usual methods, for instance by treatment with thionylchloride, phosphorous tribromide, methane sulfochloride or p-toluolsulfochloride in pyridine. Particular halogenides can be prepared in other ways too. According to the method of preparation of the known p-amino-phenethylchlorides one converts p-nitro-phenethyl alcohols which are substituted corresponding to the definition for $R_1$ and $R_2$ into the corresponding halogenides and these are then reduced to yield substituted p-amino-phenethylhalogenides. Finally the p-amino compounds are converted, corresponding to the first named method for preparation of compounds of Formula I, into the corresponding p-(1-pyrryl)-phenethylhalogenides, for instance by condensation with 2,5-dimethoxytetrahydrofurane in glacial acetic acid.

According to a sixth method for preparation, one obtains substituted phenethyl alcohols of Formula Ia, in which $R_1$ is hydrogen, by reaction of a metalorganic compound of Formula V

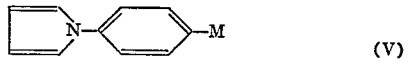

(V)

in which M is Mg-Br, Mg-I or lithium in an ether, or the like, solvent with ethylene oxide. The reaction is for instance carried out in diethyl ether, dibutyl ether, tetrahydrofuran or ethylene glycol dimethylether in known manner. If necessary, the formation of a Grignard compound, which falls under Formula V, is prepared by reaction of reactive halogen compound like methyliodide or 1,2-dibromoethane with added magnesium. The 1-halogen - 4 - (1 - pyrryl) - benzenes which are necessary for preparation of Grignard compounds are, for instance, obtained from p-halogen anilines according to the first named method for preparation of compounds of Formula I.

Pharmaceutical compositions according to the present invention contain, as active ingredient, at least one compound of Formula I in combination with an inert carrier and, if desired, other additives. The inventive compositions consist, preferably, of dosage unit forms which are suitable for the oral, rectal or parenteral application of daily doses of 1–80 mg./kg. of a compound of Formula I for warm blooded mammals. Suitable dosage unit forms for the oral or rectal application, like dragées, tablets, capsules, suppositories respectively, contain preferably 10 to 500 mg. of a compound of Formula I.

In the above named dosage unit forms, the amount of active ingredient is preferably between 5% and 90%. For preparation of tablets or dragée cores one combines the active ingredients for instance with solid powder-like carriers, like lactose, saccharose, sorbitol or mannitol; starches like potato starch, corn starch or amylopectin, highly dispersed silicon dioxide, additional laminaria powder or citrus pulp powder, cellulose derivatives or gelatine, if desired with the addition of lubricating agents like magnesium or calcium stearate or polyethylene glycols to form tablets or dragée cores. The last named are coated for instance with concentrated sugar solutions which can also contain arabic gum, talc and/or titanium dioxide or with a light volatile organic solvent or solvent mixture which contains dissolved varnish. To these coatings can be added pigments for instance to indicate different dosages of the drugs. As other oral dosage unit forms there are most suitable plugged capsules from gelatine and soft closed capsules from gelatine and a softening agent like glycerin. The first named contain the active ingredient, preferably as granulate, if desired in mixture with diluting agents like corn starch, with lubricating agents, like talc or magnesium stearate, and if desired stabilisers, like sodium metabisulfite ($Na_2S_2O_5$) or ascorbic acid. In soft capsules the active ingredient is preferably dissolved or suspended in suitable fluids, like liquid polyethylene glycols, whereby, if desired, stabilisers can be added.

As dosage unit forms for the rectal application for instance are suitable suppositories which consist of a combination of a compound of Formula I with a suppositorial ground mass, for instance natural or synthetic triglycerides, or also gelatine rectal capsules which contain a combination of the active ingredient with polyethylene glycols.

Ampoules for the parenteral, particularly intramuscular, application, contain preferably 20 to 200 mg. of a compound of Formula I as aqueous solution or dispersion, prepared with the aid of usual pharmaceutical acceptable solvents, solubilisers and/or dispersing agents. The concentration of the active ingredient is preferably between 0.5% and 5%. If necessary suitable stabilisers and/or buffer agents are added to the ampoule solutions or dispersions.

Also embraced by the present inventions are pharmaceutical compositions not made up in single dosage unit forms such as ointment, tinctures and other mixtures for local or parenteral application, which can be prepared with known foundations for ointments or pharmaceutically acceptable solvents.

As mentioned above, the present invention relates also to methods of alleviating pain and treating inflammatory diseases in mammals which methods comprise administering an effective amount of at least one compound of the invention, preferably in form of an inventive pharmaceutical composition.

It is to be understood that the dosage administered will be dependent on the species, the age, health and weight of the recipient; the severity of the condition being treated; the kind of concurrent treatment, if any; the frequency of treatment and the nature of the effect desired. Generally, the daily dosage of an active compound of Formula I will be from about 1 to about 80 mg./kg. of bodyweight. A preferred range is from about 1 to about 60 mg./kg. of bodyweight per day.

The following examples will serve to further typify the nature of the present invention, but should not be construed as a limitation on the scope thereof.

Temperatures are given in degrees centigrade.

Example 1

6.0 g. p-amino-phenethyl alcohol [H. M. Woodburn and C. F. Stuntz, J. Am. Chem. Soc 72, 1361 (1950)], 5.8 g. 2,5-dimethoxy-tetrahydrofurane and 70 ml. glacial acetic acid are refluxed for 1 hour. After evaporation of the solvent at 10 to 15 torr there remains a black oil. This is distilled at 160 to 180° air bath temperature and under 0.01 torr in a bulb tube. One obtains a mixture of p-(1-pyrryl)-phenethyl alcohol and the acetyl derivative thereof. This mixture is refluxed in 30 ml. 2 N sodium hydroxide and 50 ml. ethanol for 4 hours. The ethanol is then evaporated under reduced pressure, the residue stirred with 20 ml. water and the obtained crystals are filtered off and dried over conc. sulfuric acid at 100 torr. The p-(1-pyrryl)-phenethyl alcohol M.P. 98–100° is obtained. On recrystallisation from isopropanol the melting point rises to 101–102°.

Example 2

4.1 g. p-amino-phenethyl alcohol and 4.0 g. 2,5-dimethoxy tetrahydrofurane are refluxed in 70 ml. acetonitrile. To this reaction mixture are added 0.30 g. p-toluolsulfonic acid, dissolved in ca. 10 ml. acetonitrile. The reaction mixture is refluxed for 4 to 5 hours. After cooling in ice the p-tolylsulfonic acid is neutralised with 0.5 ml. 3 N sodium hydroxide and the acetonitrile is evaporated at reduced pressure. The remaining dark oil is distilled in a bulb tube under 0.01 torr and 170–180° bath temperature. One obtains the p-(1-pyrryl)-phenethyl alcohol, M.P. 96–99°. On recrystallisation from isopropanol the melting point rises to 101–102°.

Example 3

13.9 g. 2-[3-chloro-4-(1-pyrryl)-phenyl]-propionic acid ethyl ester dissolved in 200 ml. abs. ether are dropped while stirring to a suspension of 1.9 g. lithium aluminum hydride in 200 ml. abs. ether so that the reaction mixture refluxes. After the addition of the ester the reaction mixture is refluxed for a further 6 hours while stirring. Thereafter it is decomposed with 20 ml. water and then with sufficient ca. 20% hydrochloric acid to give a slightly acidic reaction (pH 3–4). The ether phase is separated and the aqueous phase extracted with 200 ml. ether. The combined ether phases are dried over potassium carbonate and evaporated. The remaining colourless oil is distilled in the bulb tube at 130–140° bath temperature under 0.005 torr to yield the β-methyl-3-chloro-4-(1-pyrryl)-phenethyl alcohol $n_D^{21}$=1.5889.

The starting material is prepared according to the following procedure:

(a) 149.0 g. p-(acetamido)-phenethyl acetic acid [S. Gabriel, Chem. Ber. 15, 834 (1882)] are suspended in a mixture of 485 ml. glacial acetic acid, 165 ml. water and 348 ml. conc. hydrochloric acid. To this mixture is dropped, while strongly stirring at −5°, a solution of 32.3 g. sodium chlorate in 65 ml. water within 1 hour. The reaction mixture is cooled to 0° and stirred for 15 minutes. Then there are added 75 ml. conc. hydrochloric acid, the solution is refluxed for 2 hours and then evaporated, on a steam bath of 80° and under 15 torr, to dryness. The residue from evaporation is mixed hot with 250 ml. ethanol to remove the last water by azeotropic distillation and to this mixture are added 750 ml. benzene and then it is evaporated in vacuo again. The dry crystalline residue is refluxed with a solution of 60 ml. conc. sulfonic acid in 1.5 l. abs. ethanol for 20 hours. The ethanol is then distilled off in a bath of 30° and 15–20 torr. The residue which is obtained after evaporation is brought to pH 9–10 with a mixture of same amounts of ice and concentrated sodium hydroxide and extracted with 1.5 l. methylenchloride. The methylenechloride solution is washed with 100 ml. ice water dried over magnesium sulfate and evaporated. The residue of the evaporation is subjected to fractional distillation using a 10 cm. long Vigreux column and the (4-amino-3-chloro-phenyl)-acetic acid ethyl ester (83 g.) which boils at 110–115°/0.001 torr is separated.

(b) 55.5 g. (4-amino-3-chloro-phenyl)-acetic acid ethyl ester, 500 ml. glacial acetic acid and 34.3 g. 2,5-dimethyoxy-tetrahydrofurane are refluxed for 40 minutes. The cooled reaction mixture is evaporated under reduced pressure, finally under 10 torr at a bath temperature of 70°. The resulting black oil is distilled in a bulb tube. It boils under 0.01 torr at an air bath temperature of 120–130°. The obtained [3-chloro-4-(1-pyrryl)-phenyl]-acetic acid ethyl ester crystallises on longer standing or if inoculated. A sample recrystallised from ligroin (boiling range 80–95°) melts at 36–37°.

(c) A mixture of 62.0 g. [3-chloro-4-(1-pyrryl)-phenyl]acetic acid ester, 200 ml. toluene and 260 ml. diethylcarbonate is warmed to 70°. At 75–80° a solution of 5.6 g. sodium in 200 ml. abs. ethanol is dropped rapidly thereinto while stirring. The ethanol is thereafter distilled off from the reaction mixture. By gradually rising the bath temperature to 230° it is so long distilled till the temperature of the vapor reaches 115°. To the reaction mixture are dropped 200 ml. diethylcarbonate while at the same time distilling off is continued, till the temperature of the vapor reaches 120°. The content of the flask is cooled in ice and neutralised with a mixture of 40 ml. glacial acetic acid and 400 ml. ice water. The mixture is extracted twice with each 400 ml. ether, the ether solution washed with 5% potassium bicarbonate solution, dried over sodium sulfate and evaporated whereby one obtains approximately 80 g. crude [3 - chloro - 4 - (1-pyrryl)-phenyl]-malonic acid diethyl ester. It boils at distillation in the bulb tube under 0.01 torr at 140–145° bath temperature (yield 72.0 g.).

(d) 5.1 g. sodium are dissolved in 120 ml. abs. ethanol. The solution is warmed to 50° and to the solution is added an approximately 50° warm solution of 68.0 g. [3 - chloro - 4 - (1-pyrryl)-phenyl]-malonic acid diethyl ester in 120 ml. abs. ethanol. The mixture is stirred for ½ hour at 20–30° and then there are dropped in rapidly 33.0 g. methyl iodide. Thereafter, the reaction mixture is refllxed for 1.5 hours while stirring and thereafter are added 11.0 g. methyliodide again. After further refluxing for ½ hour, the reaction mixture is evaporated under reduced pressure, taken up in 400 ml. ether and washed with each 60 ml. water, 10% sodium bisulfite solution and 20% potassium bicarbonate solution. The ether solution is dried over sodium sulfate and evaporated whereby a yellow oil is obtained (66 g.). The [3-chloro-4-(1-pyrryl)-phenyl]-methyl-malonic acid diethyl ester is distilled in the bulb tube. It boils under 0.02 torr at 130–140° air bath temperature; $n_D^{21}$=1.544 (yield 60.2 g.).

(e) 52.5 g. [3 - chloro - 4-(1-pyrryl)-phenyl]-methylmalonic acid diethyl ester, 33.6 g. potassium hydroxide, 120 ml. water and 400 ml. n-butanol are refluxed with vigorous stirring for 4 hours. The solvent is evaporated at ca. 12 torr and the residue dissolved in 300 ml. water. The aqueous solution is extracted with 150 ml. ether and after filtration acidified with conc. hydrochloric acid to pH 1–2. The separating oil is extracted twice with each 200 ml. ether, the ether extract washed with 50 ml. water, dried over magnesium sulfate and evaporated under reduced pressure. The resulting oil is distilled in the bulb tube at 160–175° bath temperature under 0.01 torr. One obtains 34.2 g. oily 2 - [3-chloro-4-(1-pyrryl)-phenyl]-propionic acid. This can as such be used for reesterification. After dissolving in ether and cooling crystals are slowly formed M.P. 73–76°. On recrystallisation from ethyl acetate the melting point of the acid rises to 79–80°.

(f) 30.0 g. crude 2 - [3-chloro-4-(1-pyrryl-phenyl]-propionic acid are refluxed with 300 ml. abs. ethanol and 4.5 ml. conc. sulfuric acid for 20 hours. The reaction mixture is evaporated in vacuo at 10–15 torr and a bath temperature of 30–40° and taken up in 1 l. methylene chloride. The methylene chloride solution is washed with 100 ml. ice water and then with 50 ml. saturated potassium bicarbonate solution, dried over sodium sulfate and evaporated. The resulting 2 - [3 - chloro - 4 - (1-pyrryl)-phenyl]-propionic acid ethyl ester is distilled in the bulb tube under 0.03 torr and at 130–140° air bath temperature; $n_D^{21}$=1.5565.

Example 4

2.2 g. lithium aluminium hydride are suspended in 200 ml. abs. ether. While stirring, a solution of 15.0 g. [3-chloro-4-(1-pyrryl)-phenyl]-acetic acid ethyl ester [see Examples 3(a) and (b)] in 300 ml. abs. ether, is dropped into the reaction mixture in such a way that the reaction mixture refluxes. After the addition of the ester the reaction mixture is refluxed while stirring for 10 hours. Then it is decomposed while cooling with ice by addition of 15 ml. water and then of 50 ml. 20% hydrochloric acid. The ether phase is separated, washed with 50 ml. 10% potassium bicarbonate solution, dried over magnesium sulfate and evaporated. The as oil resulting reaction product, can be recrystallised from isopropanol/petrol ether (B.P. 45–60°). The obtained 3-chloro-4-(1-pyrryl)-phenethyl alcohol melts at 59–61°.

Example 5

According to Example 4 one obtains from 15.0 g. 2-[p-(1-pyrryl)-phenyl]-propionic acid ethyl ester and 2.4 g. lithium aluminum hydride in 200 ml. abs. ether the β-methyl-p - (1 - pyrryl)-phenethyl-alcohol M.P. 77–79° (from isopropanol/petrolether).

The starting material is obtained according to the following procedure from the [p-(1-pyrryl)-phenyl]-acetic acid ethyl ester which is described in Example 8(a).

(a) A mixture of 80 g. [p-(1-pyrryl)-phenyl]-acetic acid ethyl ester and 280 ml. diethyl carbonate is warmed to 80°. To this mixture is rapidly dropped, at 75–80°, a solution of 10.0 g. sodium in 450 ml. abs. ethanol, while stirring. The ethanol is thereafter distilled off from the reaction mixture. By gradual raising of the bath temperature to 230° there is so long distilled till the temperature of the vapor reaches 118°. There are added 200 ml. diethyl carbonate and distilled off till the temperature of the vapor reaches 120°. The contents of the flask are cooled in ice and neutralised with a mixture of 50 ml. glacial acetic acid and 800 ml. ice water. The mixture is extracted twice with each 400 ml. ether, the ether solution washed with 5% potassium bicarbonate solution, dried over sodium sulfate and evaporated whereby the [p-(1-pyrryl)-phenyl]-malonic acid diethyl ester crystallises. It is suctioned off and washed with 50 ml. of a mixture of petrolether/benzene (2:1) and dried in vacuo. One obtains the desired ester as light beige crystals M.P. 76–81°. On crystallisation from methanol the melting point rises to 80–83°.

(b) 2.0 g. sodium are dissolved in 80 ml. abs. ethanol. The solution is warmed to 50° and then there is added a solution, at ca. 50°, of 24.0 g. p-(1-pyrryl)-phenyl]-malonic acid diethyl ester in 60 ml. abs. ethanol. The mixture is stirred for ½ hour at 40–50° and then there are dropped rapidly thereinto 16.0 g. methyl iodide. Thereafter the reaction mixture is refluxed for 4 hours while stirring and then there are added again 16.0 g. methyl iodide. After more refluxing for 2 hours the reaction mixture is evaporated under reduced pressure, taken up in 300 ml. ether and washed with each 40 ml. 10% sodium bisulfite solution and water. The ether solution is dried over sodium sulfate and evaporated whereby a yellow oil results. This is together with 6.8 g. potassium hydroxide, dissolved in 100 ml. water, refluxed for 1 hour whereby the monosubstituted malonic acid diethyl ester (starting material) is hydrolised while the desired reaction product remains unchanged. After cooling, the solution is extracted twice with each 200 ml. ether. The ethereal solution is washed with water neutral and evaporated. The resulting oil crystallises spontaneously. On recrystallisation from benzene/petrolether one obtains the methyl-[p-(1-pyrryl)-phenyl]-malonic acid diethyl ester as colourless crystals M.P. 57–58°.

(c) 19.0 g. methyl-[p-(1-pyrryl)-phenyl]-malonic acid diethyl ester, 14.0 g. potassium hydroxide, 50 ml. water and 150 ml. n-butanol are heated to boiling while stirring for 4 hours. The solvent is evaporated at ca. 12 torr and the residue is dissolved in 300 ml. water. The aqueous solution is extracted with 150 ml. ether and after filtration with 2 N hydrochloric acid brought to pH 1–2. The fine colourless precipitate is suctioned off and washed with water. The 2-[p-(1-pyrryl)-phenyl]-propionic acid, obtained as colourless crystals, melts at 168–169°.

(d) 43.0 g. 2-[p-(1-pyrryl)-phenyl]-propionic acid are refluxed with a solution of 8 ml. conc sulfuric acid in 260 ml. abs. ethanol for 6 hours. The ethanol is carefully distilled off at a bath temperature of 30–40° and in vacuo of 10–15 torr. The residue is taken up in 1 l. methylenchloride and the solution extracted with 100 ml. ice water and then with 100 ml. 10% potassium carbonate solution. The methylenechloride phase is dried over magnesium sulfate and evaporated. The 2-[-(1-pyrryl)-phenyl]-propionic acid ethyl ester distils under 0.01 torr at 120–140° air bath temperature.

Example 6

According to Example 4 one obtains from 42.5 g. 2-[p-(1-pyrryl)-phenyl]-butyric acid ethyl ester and 6.3 g. lithium aluminum hydride in 900 ml. abs. ether the β-ethyl-p-(1-pyrryl)-phenethyl alcohol M.P. 61–62° (from isopropanol).

The starting material is prepared according to the following procedure:

(a) 179.0 g. 2-(p-aminophenyl)-butyric acid [Fourneau, Sandulesco, Bl. (4), 452] and 132.0 g. 2,5-dimethoxy-tetrahydrofurane are refluxed in 200 ml. glacial acetic acid for 30 minutes while stirring. The reaction mixture is distilled from an oil bath, at the beginning under 12 torr, and then under high vacuum. The fraction which distils under 0.5–1 torr between 180–200° consists of crude 2-[p-(1-pyrryl)-phenyl]-butyric acid and crystallises in the course of the distillation, M.P. 105–110°. By recrystallisation from benzene/cyclohexene (1:1, 660 ml.) under discolouring with activated charcoal, washing of the crystals with the same solvent mixture (110 ml.) and drying for 15 hours at 50° under 0.5 torr yields the pure 2-[p-(1-pyrryl)-phenyl]-butyric acid M.P. 112–113°.

(b) 11.5 g. 2-[p-(1-pyrryl)-phenyl]-butyric acid are refluxed in a solution of 2 ml. conc. sulfuric acid in 65 ml. methanol for 4 hours. The reaction mixture is cooled to 0° and poured on ice water. The crude 2- p-(1-pyrryl)-phenyl]-butyric acid methyl ester which is precipitated as crystals is filtered off, washed with ice cold sodium carbonate solution and then with water and dried at room temperature under vacuum. After recrystallisation from methanol it melts at 56–58°.

Example 7

4.0 g. of [p-(1-pyrryl)-phenyl]-acetic acid (cp. Example 9(a) with 1.5 g. of lithium aluminum hydride in 200 ml. of ether are refluxed for 24 hours whilst stirring. The reaction mixture is then carefully decomposed, while cooling with ice, with 2 ml. of water. After the addition of 20 ml. of concentrated potassium hydroxide solution, the overlying ether solution is decanted, dried over magnesium sulphate and then concentrated by evaporation. There remain 3.3 g. of colourless crystals of M.P. 90–100°. By means of bulb-tube distillation at 130°/0.001 torr and subsequent crystallisation from isopropanol/dioxane, pure p-(1-pyrryl)-phenethyl alcohol, M.P. 101–102°, is obtained.

The β-methyl-p-(1-pyrryl)-phenethyl alcohol, M.P. 77–79° (from isopropanol/petroleum ether) is obtained, in an analogous manner, by reduction of 4.3 g. 2-[p-(1-pyrryl)-phenyl]-propionic acid (cp. Example 5(c)).

Example 8

According to Example 4 one obtains from 18.3 g. [p-(1-pyrryl)-phenyl]-acetic acid ethyl ester and 3.2 g. lithium aluminium hydride in 200 ml. abs. ether the p-(1-pyrryl)-phenethyl alcohol M.P. 101–102° (from carbon tetrachloride/isopropanol).

The starting material is prepared according to the following procedure:

(a) 21.4 g. (p-aminophenyl)-acetic acid ethyl ester [E. Ferber et al., Ber. 72, 839 (1939)], 15.9 g. 2,5-dimethoxy tetrahydrofurane and 30 ml. glacial acetic acid are refluxed for one hour. The solvent is distilled off under vacuum of 10–15 torr. The residue is distilled in high vacuo whereby the [p-(1-pyrryl)-phenyl]-acetic acid ethyl ester distils at 122–130°/0.02 torr. After recrystallisation from methanol it melts at 49–51°.

Example 9

To a solution of 0.61 g. sodium borohydride in 20 ml. diethylene-glycoldimethyl ether (diglyme) are given portionwise 4.0 g. [p-(1-pyrryl)-phenyl]-acetic acid. After all acid is dissolved, there is dropped to the reaction mixture at 10–20° in the course of 1 hour, 3.4 g. bortrifluoride etherate in 5 ml. diglyme while stirring. The reaction mixture is then kept for 3–4 hours at room temperature and then decomposed with 10 ml. ethanol. Thereafter the solvent is evaporated at 70–80° bath temperature and 12 torr. To the residue are added 20 ml. ice water, then it is brought with 2 N sodium hydroxide to pH 9–10 and extracted with 200 ml. methylene chloride. The methylene chloride solution is separated, dried over magnesium sulfate and evaporated in vacuo whereby the p-(1-pyrryl)-phenethyl alcohol M.P. 98–100° (sinter from 95°) results. After recrystallisation from water/ethanol the melting point is raised to 101–102°.

The starting material is prepared according to the following procedure:

(a) 30.2 g. (p-aminophenyl)-acetic acid (Radziszewski, Ber., 2, 209; Bedson, J. Chem. Soc. 37, 92) and 26.4 g. 2,5-dimethoxy-tetrahydrofurane are refluxed in 40 ml. glacial acetic acid for 30 minutes. After cooling the reaction solution is poured into 160 ml. water. The precipitated crystals are filtered off, washed with water and dried for 15 hours at 70°. The resulting brown powder is extracted in a Soxhlet apparatus with benzene. On evaporation of the extract one obtains the [p-(1-pyrryl)-phenyl]-acetic acid M.P. 180–182°.

Example 10

6.6 g. acetic acid-p-(1-pyrryl)-phenethyl ester (see Example 20) are dissolved in 50 ml. ethanol and refluxed with 30 ml. 2 N sodium hydroxide for 3 hours. The ethanol is then evaporated under 15–20 torr whereby the p-(1-pyrryl)-phenethyl alcohol precipitates. It is suctioned off, washed neutral with 50 ml. ice water and then dried in the vacuum drier under 100 torr at 70°. After recrystallisation from isopropanol the product melts at 101–102°.

Example 11

8.7 g. p-(1-pyrryl)-phenethyl alcohol (see Example 1), 30.3 g. propionic acid anhydride, 3.9 g. pyridine and 240 ml. benzene are refluxed for 4 hours. The reaction mixture is then evaporated under ca. 13 torr and the residue fractionated over a 6 cm. long Vigreux column, at first under 13 torr then under 0.02 torr. The propionic acid-p-(1-pyrryl)-phenethyl ester boils at 139–140°/0.02 torr. The distillate crystallises and melts then at 46–48°.

In an analogous way there are prepared:

From 5.8 g. p-(1-pyrryl)-phenethyl alcohol with 16.1 g. acetanhydride, 2.4 g. pyridine and 160 ml. benzene, the acetic acid-p-(1-pyrryl)-phenethyl ester of B.P. 145–148°/0.06 torr M.P. 63–65°;

From 7.0 g. β-methyl-p-(1-pyrryl)-phenethyl alcohol (see Example 6) with 22.6 g. propionic acid anhydride, 4.6 g. pyridine and 150 ml. benzene the propionic acid anhydride, 4.6 g. pyridine and 150 ml. benzene, the propionic acid-β-methyl-p-(1-pyrryl)-phenethyl ester of B.P. 130–140°/0.01 torr; ($n_D^{21}=1.552$);

From 7.1 g. β-ethyl-p-(1-pyrryl)-phenethyl alcohol (see Example 6) with 21.6 g. propionic acid anhydride, 4.3 g. pyridine and 140 ml. benzene the propionic acid-β-ethyl-p-(1-pyrryl)-phenethyl ester of B.P. 141–142°/0.01 torr.

From 3.5 g. 3-chloro-4-(1-pyrryl)-phenethyl alcohol (see Example 4) with 10.4 g. propionic acid anhydride, 2.2 g. pyridine and 100 ml. benzene, the propionic acid-3-chloro-4-(1-pyrryl)-phenethyl ester of B.P. 100/0.001 torr;

From 2.4 g. β-methyl-3-chloro-4-(1-pyrryl)-phenethyl alcohol (see Example 3) with 7.2 g. propionic acid anhydride, 1.5 g. pyridine and 70 ml. benzene, the propionic acid-β-methyl-3-chloro-4-(1-pyrryl) - phenethyl ester of B.P. 120–125°/0.08 torr.

Example 12

1.2 g. pivalyl chloride dissolved in 5 ml. methylenechloride are dropped at 10–30° to a solution of 1.45 g. p-(1-pyrryl)-phenethyl alcohol and 3.3 g. 2,6-lutidine in 15 ml. methylene chloride. The reaction mixture is stirred for 15 hours at room temperature, thereafter washed with 10 ml. ice cold 20% hydrochloric acid and 10 ml. saturated potassium bicarbonate solution and dried over magnesium sulfate. Then the solvent is evaporated, the residue is first distilled in a bulb tube at 130° under 0.001 torr and then the distillate is recrystallised from ethanol/water (1:1). The obtained pivalic acid-p-(1-pyrryl)-phenethyl ester melts at 58–61°.

Example 13

An aqueous solution of 1 g. of succinaldehyde was first prepared by stirring an emulsion of 1.88 g. of 2,5-(diacetoxy)-tetrahydrofuran in 10 ml. of 0.1 N hydrochloric acid at room temperature, until a homogeneous solution was obtained (about 20 min.).

This solution of succinaldehyde was added in one portion to a solution of 1.37 g. of 4-aminophenethyl alcohol in 3 ml. of water and 14 ml. of dioxane. The resulting clear solution of pH 3–4 was left standing at room temperature (1 hour) and then heated under reflux (1 hour). The turbid dark reaction mixture was poured into 25 ml. of water and the mixture extracted three times with ether (25+25+50 ml.). A small amount of methanol was added during the two last extractions to ease separation. The ethereal extract was washed twice with 10+10 ml. of water. The aqueous washings were extracted with two 20 ml. portions of ether. This ethereal extract was washed with 10 ml. of water and added to the first extract. The combined ethereal extracts were dried with magnesium sulphate and evaporated to dryness from a water bath (100°) under reduced pressure. The p-(1-pyrryl)-phenethyl alcohol so obtained has a M.P. of 98–100°. After recrystallisation (isopropanol) M.P. 101–102°.

Example 14

A solution of 1 g. of succinaldehyde in 3 ml. of acetic acid was first prepared by shaking an emulsion of 1.88 g. of 2,5-(diacetoxy)-tetrahydrofuran and 10 ml. of 0.1 N hydrochloric acid at room temperature, until a clear reaction mixture was obtained (about 20 min.). Immediately after this moment 4 mg. of potassium acetate was added and dissolved to neutralize the hydrogen chloride catalyst.

A solution of 1.37 g. of 4-aminophenethyl alcohol in 5 ml. of acetic acid was added to the above solution of succinaldehyde in acetic acid and the mixture heated under reflux (15 minutes). The dark red reaction mixture was poured into 25 ml. of 0.6 N hydrochloric acid. A black tarry precipitate was found. The entire mixture was extracted three times with ether (50+10+10 ml.). The ethereal extract was washed with 10 ml. of water and evaporated to dryness. The semi-solid residue was heated under reflux (15 minutes) with 1.2 g. of sodium hydroxide, 5 ml. of water and 5 ml. of ethanol. 10 ml. of water were added and the solution left standing overnight at 5°. The resulting crystalline precipitate of p-(1-pyrrolyl)-phenethyl alcohol was isolated by filtration, washed with 2 ml. ethanol/water (1:3) and then with 9 ml. of water, and dried (50°, 0.3 torr). After crystallisation from methanol/water (3:1 the pure product is obtained, M.P. 101–102°.

Example 15

2.74 g. of 4-aminophenethyl alcohol, 3.76 g. of 2,5-(diacetoxy)tetrahydrofuran, and 3.5 ml. acetic acid were mixed and heated under reflux (30 minutes). The dark reaction mixture was poured into 30 ml. of N hydrochloric acid. A black tarry precipitate was formed. The mixture was worked up as described in the preceding experiment. The p-(1-pyrryl)-phenethyl alcohol so obtained has a M.P. (after recrystallisation from isopropanol) of 101–102°.

Example 16

A quantity of 2.1 g. of magnesium chips in a sulphonating flask is covered with 10 ml. of absolute ether. Without stirring, 3.8 g. of 1,2-dibromoethane are added. As soon as the reaction is vigorously proceeding, 100 ml. of absolute ether are quickly added dropwise, while stirring, so that the reaction continues with refluxing clearly occurring. An addition is then made, in 4–5 portions, of 11.1 g. of p-(1-pyrryl)-bromobenzene. When the reaction slows down, a further addition of 1.0 g. of 1,2-dibromoethane is made and the reaction mixture is further stirred for 1 hour at 20–30°. After cooling in ice, a solution of 10 ml. of liquified ethylene oxide in 50 ml. of ice cold, absolute ether is added dropwise as quickly as possible at 5–10°. The formed precipitate is stirred for one hour at 20–30°. The reaction mixture is then decomposed with 20 ml. of cold 2 N hydrochloric acid and is acidified by a further addition of hydrochloric acid (pH ca. 1–2). The ether phase is separated, washed with 20 ml. of saturated potassium bicarbonate solution, dried (magnesium sulphate) and concentrated by evaporation. The oily residue is distilled in a bulb tube. The fraction boiling at 100–140°/0.01 torr is purified by crystallisation from isopropanol/ligroin, by sublimation at 100° bath/0.01 torr and repeated crystallisation, whereby the pure p-(1-pyrryl)-phenethyl alcohol, M.P. 100–102° is obtained.

The p-(1-pyrryl)-bromobenzene, required as starting material, is produced as follows:

A mixture of 50.0 g. of p-bromoaniline, 38.4 g. of 2,5-dimethoxytetrahydrofuran and 120 ml. of glacial acetic acid is refluxed for half an hour. The dark reaction mixture is concentrated by evaporation as extensively as possible under 10–20 torr and at 50–80° bath temperature in a rotary evaporator. The residue is distilled in a bulb tube at 100° bath temperature and under $10^{-3}$ torr. Thus obtained are 50 g. of colourless p-(1-pyrryl)-bromobenzene, M.P. 94–96° after crystallisation from methanol.

Example 17

To a solution of 8.0 g. of 2-[3-chloro-4-(1-pyrryl)-phenyl]-propionic acid methyl ester in 200 ml. of methanol are added, in portions, 11.4 g. of sodium borohydride within ca. 1 hour. The reaction mixture commences to boil and is finally refluxed for 1 hour. The methanol is then distilled off under reduced pressure and the residue distributed between 30 ml. of water and 300 ml. of ether. The ether solution is separated, dried and concentrated by evaporation. A small amount of methyl ester still present in the concentrated residue is saponified by boiling with a mixture of 80 ml. of ethanol and 20 ml. of 2 N NaOH. By concentrating by evaporation and extraction as above, 5.5 g. of crude 2-[3-chloro-4-(1-pyrryl)]-β-methyl-phenethyl alcohol are obtained. By distillation in a bulb tube at 120°/0.01 torr, pure alcohol is obtained as a colourless oil, $n_D^{23}$=1.5893.

The 2-[3-chloro-4-(1-pyrryl)-phenyl]-propionic acid methyl ester, required as starting material, is produced as follows:

In 400 ml. of methanol are refluxed 20.1 g. of 2-[3-chloro-4-(1-pyrryl)-phenyl]-propionic acid (cp. Example 3 (g.)), whereby an intense stream of hydrochloric acid gas is introduced. After 3–4 hours, the solution is concentrated by evaporation under reduced pressure. The residue is dissolved in 400 ml. of methylene chloride and washed successively with 40 ml. of ice water and then with 40 ml. of saturated potassium bicarbonate solution. The methylene chloride solution is dried over magnesium sulphate and concentrated by evaporation. By distillation of the residue in a bulb tube at 0.01 torr and 140° are obtained 15.6 g. of 2-[3-chloro-4-(1-pyrryl)-phenyl]-propionic acid methyl ester.

The following are produced analogously: from 6.2 g. of [3 - bromo - 4 - (1 - pyrryl) - phenyl] - acetic acid ethyl ester (M.P. 158–160°) in 100 ml. of methanol by addition of 15.2 g. of sodium borohydride, spread over 24 hours, 4.0 g. of 3-bromo-4-(1-pyrryl)-phenethyl alcohol, which boils at 120–130°/0.005 torr and which solidifies to form colourless crystals, which melt at 63–65°.

Example 18

To a solution of 2.3 g. of [p-(1-pyrryl)-phenyl]-acetic acid ethyl ester in 120 ml. of methanol are added, in portions, 3.8 g. of sodium borohydride. The reaction mixture commences to boil. It is refluxed for a further ½–1 hour, cooled with 20 ml. of water and the methanol is distilled off in a rotary evaporator. The residue is distributed between 100 ml. of ether and 10 ml. of water. The ether solution is then separated, dried and concentrated by evaporation. This yields 1.1 g. of p-(1-pyrryl)-phenethyl alcohol, which melts, after crystallisation from isopropanol/ligroin, at 100–102°.

Example 19

0.45 g. of 4-amino-3-chloro-β-methyl-phenethyl alcohol, 0.32 g. of 2,5-dimethoxytetrahydrofuran and 0.03 g. of p-toluene sulphonic acid are reacted, analogously to Example 2, in 10 ml. of acetonitrile and yield the 3-chloro-4-(1-pyrryl)-β-methylphenethyl alcohol, which distills in the bulb tube at 120–130°/0.01 torr; $n_D^{23}$=1.5893.

The alcohol required as starting material is produced as follows:

(a) 31.2 g. of methyl-malonic acid diethyl ester are dissolved, with the exclusion of moisture, in 100 ml. of dimethyl formamide. The solution is mixed in portions, while cooling with ice water, with 8.6 g. of sodium hydride dispersion (50% in oil), whereby the temperature remains continually below 40°. After completion of the addition, the mixture is heated to 70–80° and 28.8 g. of 2,4-dichloro-nitrobenzene, dissolved in 50 ml. of dimethyl formamide, are quickly added dropwise. The reaction mixture changes colour and reacts slightly exothermically, so that the heating can be temporarily removed. After the addition has been made, the mixture is further stirred for 16 hours at 80°, then cooled and the reaction mixture is poured on to 2000 ml. of water. The emulsion is extracted three times with ether using 500 ml. of ether each time. The ether extracts are washed with water 3 times using 500 ml. of each time, and once with 40 ml. of sodium chloride solution, after which they are combined, dried and concentrated by evaporation. The residue, 54.3 g. of orange-coloured oil, is allowed to stand for some time in a small separating funnel, whereby the mineral oil of the sodium hydride dispersion precipitates at the top and can be separated. By distillation in the bulb tube of the crude product, 31.2 g. of (3-chloro-4-nitro-phenyl)-methyl-malonic caid diethyl ester are obtained as a light-yellow oil, $M.P._{0.001}$=125–140°.

(b) 17.5 g. of (3-chloro-4-nitrophenyl)-methyl-malonic acid diethyl ester, dissolved in 100 ml. of dioxane, are hydrogenated with the addition of 4 g. of Raney-nickel under normal pressure and at room temperature. If the hydrogenation prematurely ceases, further amounts of catalyst must be added. After hydrogenation, the catalyst is filtered off and the mixture subsequently washed with dioxane. The filtrates are combined and concentrated by evaporation in a rotary evaporator. The residue is taken up in 100 ml. of ether and washed twice with 20 ml. of water and once with 15 ml. of concentrated sodium chloride solution. After drying and concentration of the ether extracts by evaporation, 14.8 g. of light-green oil are obtained. From distillation in the bulb tube are obtained 9.5 g. of (3-chloro-4-amino-phenyl)-methyl-malonic acid diethyl ester, B.P.$_{0.05}$=160–170°.

(c) 3.1 g. of sodium metal are dissolved, with exclusion of moisture, in 300 ml. of absolute alcohol and a solution of 30 g. of (4-amino-3-chloro-phenyl)-methyl-malonic acid diethyl ester in 200 ml. abs. alcohol is then added. The mixture is refluxed for 22 hours, then cooled and the alcohol evaporated off. Ice and water are added and the solution is adjusted to a pH value of 1–2 using 5 N hydrochloric acid. Ether is added, the solution is thoroughly shaken and the layer of hydrochloric acid separated. The ether layers are extracted 6 times using each time 100 ml. of 1 N hydrochloric acid. The hydrochloric acid extracts are combined, adjusted to pH 8–9 with sodium hydroxide solution and extracted with ether. After washing, drying and concentrating the ether extracts by evaporation, 9 g. of 2-(4-amino-3-chloro-phenyl)-propionic acid ethyl ester is obtained, which are distilled in the bulb tube at 103–110°/0.01 torr. Their hydrochloride melts at 156–158° (from isopropanol).

(d) 6.0 g. of 2-(4-amino-3-chlorophenyl)-propionic acid ethyl ester, dissolved in 50 ml. of absolute ether, are added dropwise at 10–20° to a suspension of 1.4 g. of lithium aluminium hydride in 400 ml. of absolute ether and then refluxed for 16 hours. While cooling with ice, the mixture is decomposed dropwise with 5 ml. of water, whereupon 10 ml. of concentrated potassium hydroxide solution are added and the overlying ether layer is then decanted. After drying the ether solution over magnesium sulphate, the ether is evaporated off. The oil remaining distilled in the bulb tube at 130–140°/0.001 torr and 4.5 g. of 4-amino-3-chloro-β-methyl-phenethyl alcohol are obtained as a light-yellow oil, $n_D^{22}$=1.5727.

Example 20

4.5 g. of acetic acid-p-aminophenethyl ester [obtained by catalytic reduction of the p-nitrophenethyl ester (see E. Ferber, Ber. dtsch. Chem. Ges. 62, 183 (1929)) over Raney-nickel in dioxane at atmospheric pressure], and 3.3 g. of 2,5-dimethoxytetrahydrofuran are refluxed for 1 hour in glacial acetic acid. After evaporating off the acetic acid under 10 torr, the residue is distilled in high vacuum. The acetic acid-p-(1-pyrryl)-phenethyl ester boils at 145–148°/0.06 torr and melts at 63–65°.

In an analogous manner is obtained, using 5.6 g. of pivalic acid-p-aminophenethyl ester the pivalic acid-p-(1-pyrryl)-phenethyl-ester, M.P. 58–61° (from ethanol/water.)

The required starting material is obtained in the following manner:

6.8 g. of p-nitrophenethyl alcohol and 3.5 g. of pyridine are dissolved in 100 ml. of methylene chloride and are mixed dropwise at 20–30° with 5.9 g. of pivalic acid chloride. The reaction mixture is then refluxed for 3–4 hours, washed once with, in each case, 20 ml. of 2 N hydrochloric acid, 10 ml. of saturated potassium bicarbonate solution and 10 ml. of water, and dried over magnesium sulphate. The crystalline residue remaining after concentrating by evaporation is distilled in the bulb tube at 150°/0.005 torr. The thus obtained pivalic acid-p-nitrophenethyl ester melts at 40–42°. It is hydrogenated as in the preceding example and yields the pivalic acid-p-aminophenethyl ester. B.P. 135°/0.001 torr in a bulb tube, $n_D^{22}$=1.516.

Example 21

4.6 g. of p-amino-β-methyl-phenethyl alcohol (cp. J. B. Dickey and J. M. Straley, Brit.Pat. 716.937, 20th. October 1954, and F. Nerdel et al., J. pr. Chem. 12[4], 110 (1960)) are reacted analogously to Example 2. The β-methyl-p-(1-pyrryl)-phenethyl alcohol, M.P. 77–79°, (from isopropanol/petroleum ether) is thus obtained.

The following is obtained analogously:

The 3-chloro-4-(1-pyrryl)-phenethyl alcohol, M.P. 59–61° (from isopropanol/petroleum ether) is obtained from 3.4 g. of 4-amino-3-chloro-phenethyl alcohol, 2.6 g. of 2,5-dimethoxytetrahydrofuran and 0.20 g. of p-toluene sulphonic acid in 60 ml. of acetonitrile.

The 4-amino-3-chlorophenethyl alcohol, required as starting material, is produced in the following manner:

7.5 g. of (4-amino-3-chlorophenyl)-acetic acid ethyl ester (see Example 3(a)) are reduced, analogously to Example 19(d), with 1.9 g. of lithium aluminium hydride in 500 ml. of ether. The 4-amino-3-chlorophenethyl alcohol, M.P. 58–60°, is obtained by distillation in the bulb tube at 130–140°/0.002 torr.

Example 22

4.8 g. of propionic acid-p-aminophenethyl ester, 3.3 g. of 2,5-dimethoxytetrahydrofuran and 0.25 g. of p-toluene sulphonic acid are reacted, analogously to Example 2 in 70 ml. of acetonitrile. The propionic acid-p-(1-pyrryl)-phenethyl ester, which boils at 139–140°/0.02 torr and melts at 46–48° is thus obtained.

The p-aminophenethyl esters, which are required as starting material, are produced as follows:

(a₁) 6.8 g. of p-nitrophenethyl alcohol [E. Ferber, Ber. dtsch. Chem. Ges. 62, 183 (1929)] and 3.8 g. of pyridine in 100 ml. of benzene with 20.0 g. of propionic acid anhydride are refluxed for 4–6 hours. The solvent and the excess anhydride are distilled off under 12 torr. The residue is dissolved in 100 ml. of ether, is washed with 10 ml. of 2 N hydrochloric acid and then twice with saturated potassium bicarbonate solution, using 20 ml. each time, and dried over magnesium sulphate. The residue remaining after evaporating off the ether is distilled at 130–140°/0.005 torr in the bulb tube. The thus obtained propionic acid-p-nitrophenethyl ester ($n_D^{22}$=1.526) is hydrogenated with Raney nickel in dioxane with a hydrogen pressure of 1–2 atmospheres and at 20–40°.

The propionic acid-p-aminophenethyl ester obtained after concentration by evaporation of the hydrogenated solution boils at 120°/0.001 torr in a bulb tube, $n_D^{22}$=1.534.

Example 23

2.5 g. of propionic acid-3-chloro-4-(1-pyrryl)-phenyl-ethyl ester (cp. Example II), 15 ml. of alcohol and 10 ml. of 1 N sodium hydroxide solution are refluxed for 3 hours. After cooling, the alcohol is removed on the rotary evaporator and the residue extracted with 30 ml. of ether. The ether solution is washed with 5 ml. of water, dried over magnesium sulphate and concentrated by evaporation. The oil remaining distills in the bulb tube at 130° bath temperature under 0.001 torr and solidifies after a short time. The pure 3 - chloro - 4 - (1 - pyrryl)-phenethyl alcohol melts at 59–61° (from isopropanol/petroleum ether).

The following is obtained analogously:

The β-methyl-p-(1-pyrryl)-phenethyl alcohol), M.P. 77–79° (from isopropanol/petroleum ether) is obtained from 2.3 g. of propionic acid-β-methyl-p-(1-pyrryl)-phenyl ethyl ester.

Example 24

1.7 g. of p-toluene sulphonic acid-p-(1-pyrryl)-phenethyl ester, 1.7 g. of anhydrous sodium acetate and 50 ml. of anhydrous dimethyl formamide are stirred for 5–7 hours at 100°. The solvent is then evaporated off at 10–12 torr and the residue distributed between 20 ml. of water and 50 ml. of ether. The ether phase is separated, dried over sodium sulphate and concentrated by evaporation.

The initially oily residue crystallises. By repeated recrystallisation from ligroin the pure acetic acid-p-(1-pyrryl)-phenethyl ester, M.P. 63–65°, is obtained.

The p-toluene sulphonic acid ester required as starting material is obtained, according to E. Jenny and S. Winstein, Helv. Chim. Acta 41, 820 (1958), from 1.8 g. of p-(1-pyrryl)-phenethyl alcohol (cp. Examples 7 and 8) and 2.3 g. of p-toluene sulphonic acid chloride in 10 ml. of pyridine. The pure p-toluene sulphonic acid-p-(1-pyrryl)-phenethyl ester melts at 125–127° (from isopropanol/methanol/dioxane).

Example 25

3.6 g. of p-toluene sulphonic acid-[β-methyl-p-(1-pyrroyl)-phenethyl ester] and 4.0 g. of anhydrous sodium propionate are stirred for 6–7 hours at 100° in 100 ml. of anhydrous dimethyl formamide and then processed as in Example 24. By bulb-tube distillation of the crude product at 130–140°/0.01 torr, the propionic acid-β-methyl-p-(1-pyrryl)-phenethyl ester ($n_D^{21}$=1.552) is obtained.

The p-toluene sulphonic ester, which is required as starting material, is obtained according to E. Jenny and S. Winstein, Helv. Chem. Acta 41, 820 (1958), by the reaction of 14.5 g. of β-methyl-p-(1-pyrryl)-phenethyl alcohol (cp. Example 5) and 17.8 g. of p-toluene sulphonic acid chloride in 75 ml. of pyridine. The pure p-toluene sulphonic acid-β-methyl-p-(1-pyrryl)phenethyl ester melts at 98–101° (from methanol).

Example 26

2.0 g. of p-toluene sulphonic acid-[3-chloro-4-(1-pyrryl)-phenethyl ester] and 4.5 g. of sodium propionate are reacted analogously to Example 24. By bulb-tube distillation of the crude product at 110°/0.001 torr, the propionic acid-3-chloro-4-(1-pyrryl)-phenethyl ester is obtained.

The p-toluene sulphonic acid-[3-chloro-4-(1-pyrryl)-phenethyl ester] is produced according to E. Jenny and S. Winstein, Helv. Chim. Acta 41, 820 (1958) from 1.8 g. of 3-chloro-4-(1-pyrryl)-phenethyl alcohol (cp. Example 4) and 2.0 g. of p-toluene sulphonic acid chloride in 10 ml. of pyridine. The compound is oily. It is chromatographed on silica gel and exhibits $n_D^{22}$=1.590.

Example 27

1.7 g. of p-toluene sulphonic acid-p-(1-pyrryl)-phenethyl ester and 2.5 g. of sodium pivaloate are reacted as in Example 24. This thus yields the crude crystalline pivalic acid-p-(1-pyrryl)-phenethyl ester, which melts at 58–61° (from ethanol/water).

Example 28

5.0 g. of p-(1-pyrryl)-phenethyl bromide and 8.0 g. of anhydrous sodium propionate are stirred for 4–6 hours in 100 ml. of dimethyl sulphoxide at 100°. After distilling off the solvent under 10 torr, the residue is thoroughly shaken with 200 ml. of ether and 50 ml. of water. The ether phase is dried and concentrated by evaporation. The concentrated residue is distilled at 140°/0.01 torr in the bulb tube and then recrystallised from ligroin. The propionic acid-p-(1-pyrryl)-phenethyl ester melts at 46–48°. The p-(1-pyrryl)-phenethyl bromide, required as starting material, is produced as follows:

(a) p-Nitro-phenethyl bromide is reduced with stannous chloride to the p-amino-phenethyl bromide hydrochloride, M.P. 195–200°.

(b) The base is liberated from 3.5 g. of p-aminophenethyl bromide hydrochloride using concentrated potassium hydroxide solution, it is extracted with ether and dried over magnesium sulphate.

The crude p-amino-phenethyl bromide (2.7 g.), which remains after distilling off the ether in a water-jet vacuum at 30° bath temperature, is refluxed with 30 ml. of glacial acetic acid and 1.8 g. of 2,5-dimethoxytetrahydrofuran for 15 minutes in an oil bath preheated to 130°. The reaction mixture is then concentrated by evaporation under 12 torr and the residue is distilled in the bulb tube at 140–150°/0.002 torr. The crystalline p-(1-pyrryl)-phenethyl bromide is recrystallised from methanol, whereupon it melts at 101–103°.

Example 29

The 3-chloro-4-(1-pyrryl)-phenethyl alcohol, M.P. 59–61° (from isopropanol petroleum ether) is produced, analogously to Example 13, from 3.4 g. of 4-amino-3-chlorophenethyl alcohol (see Example 21) and 3.8 g. of 2,5-(diacetoxy)-tetrahydrofuran in 20 ml. of glacial acetic acid.

Example 30

The β-methyl-p-(1-pyrryl)-phenethyl alcohol, M.P. 77–79° (from isopropanol/petroleum ether) is produced, analogously to Example 15, from 1.5 g. of p-amino-β-methyl-phenethyl alcohol (cp. Example 21) and 1.88 g. of 2,5-(diacetoxy)-tetrahydrofuran.

In the following there are given some examples for the preparation of different application forms.

Example 31

500.0 g. active ingredient, for instance β-methyl-p-(1-pyrryl)-phenethyl alcohol, are mixed together with 550.0 g. lactose and 292.0 g. potato starch. The mixture is moistened with an ethanolic solution of 8.0 g. gelatine and granulated through a sieve. After drying, to the reaction mixture is mixed 60.0 g. potato starch, 60.0 g. talc, 10.0 g. magnesium stearate and 20.0 g. highly dispersed silicon dioxide and the mixture is then pressed to yield 10,000 tablets, each of which has 150 mg. weight and 50 mg. active ingredient, which can be, if desired, notched to permit administration of fractional dosages.

Example 32

From 250.0 g. active ingredient, for instance 3-chloro-4-(1-pyrryl)-phenethyl alcohol, 175.90 g. lactose and an ethanolic solution of 10.0 g. stearic acid, one prepares a granulate, which is mixed after drying together with 56.60 g. highly dispersed silicon dioxide, 165.0 g. talc, 20.0 potato starch and 2.50 g. magnesium stearate and which is pressed to yield 10,000 dragée cores. These are coated with a concentrated syrup from 502.28 g. crystalline saccharose, 6.0 g. shellac, 10.0 g. arabic gum, 0.22 g. pigment and 1.5 g. titanium dioxide and dried. The obtained dragées weigh each 120 mg. and contain each 25 mg. active ingredient.

Example 33

For preparing 1000 capsules with each 25 mg. active ingredient, one mixes 25 g. propionic acid-p-(1-pyrryl)-phenethyl ester with 248.0 g. lactose, the mixture is moistened homogeneously with an aqueous solution of 2.0 g. gelatine and granulated through a suitable sieve (for instance sieve III according to pH.Helv.V). The granulate is mixed with 10.0 g. dried corn starch and 15.0 g. talc and made up into 1,000 hard gelatine capsules of size 1.

Example 34

One prepares a suppository mass from 5.0 g. p-(1-pyrryl) alcohol and 163.5 g. adeps solidus and moulds therewith 100 suppositories with each 50 mg. amount of active ingredient.

Example 35

10.0 g. p-(1-pyrryl)-phenethyl alcohol are dissolved in 500 ml. 3-methoxy-propanol. The solution is diluted with water to 1,000 ml. volume and filled into 500 ampoules, each containing 2 ml.

What we claim is:

1. A pharmaceutical composition comprising an anti-inflammatory or analgetically effective amount of a compound of the formula

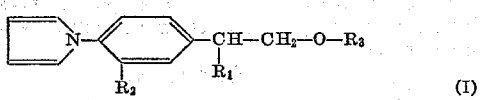

(I)

wherein
R$_1$ is hydrogen, methyl or ethyl,
R$_2$ is hydrogen or chloro, and
R$_3$ is hydrogen or alkanoyl having from 2 to 5 carbon atoms, and a pharmaceutical carrier.

2. A composition as claimed in claim 1, wherein R$_1$ is hydrogen or methyl, R$_2$ is hydrogen or chloro and R$_3$ is hydrogen, acetyl, propionyl or pivalyl.

3. A composition as claimed in claim 1, in which compounds is the p-(1-pyrryl)-phenethyl alcohol.

4. A composition as claimed in claim 1, in which compounds is the 3-chloro-4-(1-pyrryl)-phenethyl alcohol.

5. A composition as claimed in claim 1, in which compounds is the β-methyl-p-(1-pyrryl)-phenethyl alcohol.

6. A composition as claimed in claim 1, in which compounds is the 3-chloro-4-(1-pyrryl)-β-methylphenethyl alcohol.

7. A composition as claimed in claim 1, in which compounds is the propionic acid-p-(1-pyrryl)-phenethyl ester.

8. A composition as claimed in claim 1, in which compounds is the propionic acid-3-chloro-4-(1-pyrryl)-phenethyl ester.

9. A composition as claimed in claim 1, in which compounds is the pivalic acid-p-(1-pyrryl)-phenethyl ester.

10. A composition as claimed in claim 1, in which compounds is the acetic acid-p-(1-pyrryl)-phenethyl ester.

11. The method of alleviating pain in a mammal comprising administering to said mammal an analgesically effective amount of a compound as defined in claim 1.

12. The method of treating inflammatory diseases in a mammal comprising administering to said mammal an anti-inflammatory effective amount of a compound as defined in claim 1.

References Cited

UNITED STATES PATENTS 3,349,091   10/1967   Chinn _____ 260—268

STANLEY J. FRIEDMAN, Primary Examiner